US008948414B2

(12) United States Patent
Tzirkel-Hancock et al.

(10) Patent No.: US 8,948,414 B2

(45) Date of Patent: Feb. 3, 2015

(54) PROVIDING AUDIBLE SIGNALS TO A DRIVER

(75) Inventors: Eli Tzirkel-Hancock, Ra'anana (IL); Omer Tsimhoni, Herzliya (IL)

(73) Assignee: GM Global Technology Operations LLC, Detroit, MI (US)

( * ) Notice: Subject to any disclaimer, the term of this patent is extended or adjusted under 35 U.S.C. 154(b) by 323 days.

(21) Appl. No.: 13/448,025

(22) Filed: Apr. 16, 2012

(65) Prior Publication Data

US 2013/0272536 A1 Oct. 17, 2013

(51) Int. Cl.

*H04B 1/00* (2006.01)

*H04S 7/00* (2006.01)

(52) U.S. Cl.

CPC .................................... *H04S 7/303* (2013.01)

USPC ............................................................ 381/86

(58) Field of Classification Search

CPC ........... H04R 1/02; H04N 5/222; H04N 5/262

USPC ......... 381/86, 56–59, 97–103, 1, 17–19, 309, 381/310; 700/94

See application file for complete search history.

(56) References Cited

U.S. PATENT DOCUMENTS

| | | | | |
|---|---|---|---|---|
| 8,213,637 | B2 * | 7/2012 | Brannmark et al. | 381/98 |
| 8,422,693 | B1 * | 4/2013 | Daily et al. | 381/86 |
| 2006/0002571 | A1 * | 1/2006 | Holloway et al. | 381/104 |
| 2007/0154045 | A1 * | 7/2007 | Basir | 381/365 |
| 2012/0008806 | A1 * | 1/2012 | Hess | 381/302 |

* cited by examiner

*Primary Examiner* — Lun-See Lao

(74) *Attorney, Agent, or Firm* — Mark S. Cohen; Pearl Cohen; Zedek Latzer Baratz LLP

(57) ABSTRACT

A method for providing audible signals (such as speech) to a driver of a vehicle which appear to originate from a virtual sound source in front of the driver, so that it will feel normal for the driver to respond interactively by speaking without turning the head to the source of the audible signal. The driver's head position is estimated according to data provided by sensors in the driver's seat, and this position data, together with acoustical characteristics of the vehicle interior, is used to derive a transfer function for filtering electrical audible signals to the loudspeakers to simulate a virtual sound source in front of the driver.

13 Claims, 3 Drawing Sheets

PROVIDING AUDIBLE SIGNALS TO A DRIVER

BACKGROUND

Drivers are increasingly required to interact with electrically transmitted audible signals, particularly speech, such as with a mobile telephone or with systems for navigation, information, and entertainment.

It would be beneficial if the interactive audible signals were to sound as coming from a source in front of the driver, rather than from the side or rear. In this manner, it would feel more natural for the driver to interactively respond by speaking in a forward direction toward the perceived source of the audible signals, without turning the head. In most vehicles, however, there is no provision for locating a loudspeaker in front of the driver—audible signals must physically originate from loudspeakers in other locations. It is desirable, therefore, to have a method for electronically altering the signals prior to input to the loudspeakers in order to simulate a virtual sound source in front of the driver, taking into account the location of the driver's head and the acoustical characteristics of the vehicle's interior. This goal is met by the present invention.

SUMMARY

According to an embodiment of the present invention, a method is provided for creating a virtual audible source for an audible signal at a virtual source location relative to a listener seated in a seat of a vehicle interior, the vehicle interior having interior acoustical characteristics and at least one loudspeaker having a predetermined loudspeaker location, the method including: obtaining seat data from one or more sensors located in the seat; computing an estimated head position of the listener based on the seat data; computing an acoustical transfer function for the at least one loudspeaker according to the estimated head position, the virtual source location, the predetermined loudspeaker location, and the interior acoustical characteristics; applying the acoustical transfer function to the audible signal to obtain a filtered audible signal; and sending the filtered audible signal to the at least one loudspeaker.

BRIEF DESCRIPTION OF THE FIGURES

Examples are described in the following detailed description and illustrated in the accompanying drawings in which.

DETAILED DESCRIPTION

The term "vehicle" herein encompasses all means of transportation for passengers and freight, non-limiting examples of which include: aircraft, trains, boats, and road vehicles. Embodiments of the invention are described in terms of a vehicle driver, but the invention is also applicable to any listener in a vehicle.

The term "head-up display" (HUD) herein denotes any transparent display that presents visual data to a user from a direction along the user's normal line-of-sight, so that the user need not turn the head or eyes away from the normal line-of-sight to view the display. As used herein, HUD also relates in particular to a display projected onto the inside surface of a vehicle windshield and reflected toward the user therefrom.

Sources of audible signals in a vehicle include loudspeakers within the vehicle interior.

Figure 1:
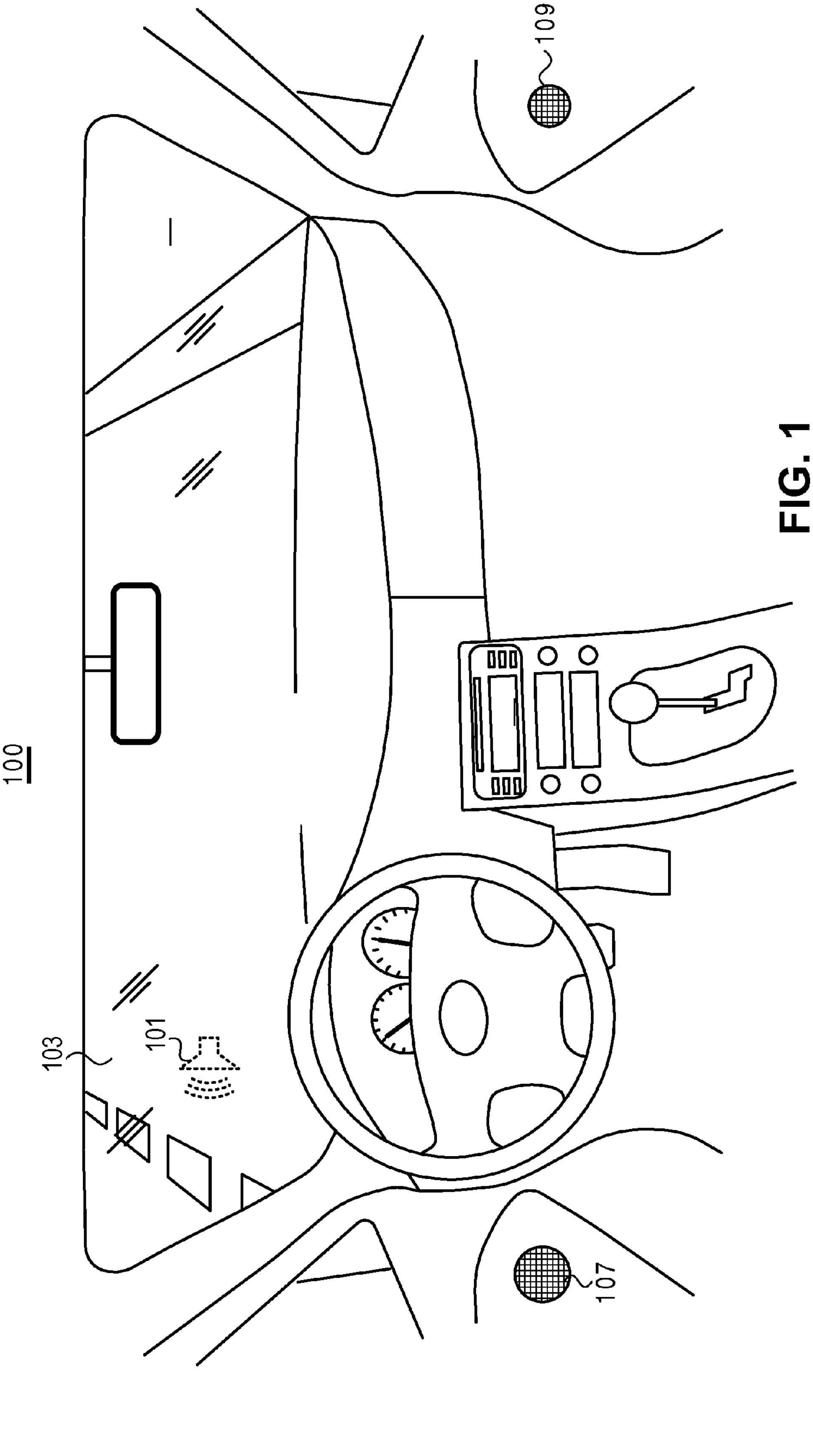
FIG. 1 conceptually illustrates a vehicle interior as seen by a driver.

FIG. 1 conceptually illustrates a vehicle interior 100 as seen by a driver. A virtual audible signal source 101 according to embodiments of the invention is in front of the driver, as the driver looks through a windshield 103. A first loudspeaker 107 and a second loudspeaker 109 are the physical sources of the audible signal.

In the field of acoustics, a head-related transfer function (HRTF) characterizes how an ear receives a sound from a point in space. It is known that a pair of HRTFs for the listener's ears can be used to synthesize a binaural sound that appears to the listener to originate from a specified point. Therefore, according to embodiments of the invention, a pair of HRTFs are used to calculate a transfer function by which an audible signal can be processed to produce physical audible signals emanating from loudspeaker 107 and loudspeaker 109 which combine to synthesize an audible signal that sounds to the driver as if the audible signal originates from virtual audible signal source 101.

In order to synthesize an audible signal having virtual audible signal source 101, it is necessary to derive the applicable HRTFs for the position and characteristics of the listener's head.

According to embodiments of the invention, HRTF's may be approximated utilizing the following data:

- listener head position estimated according to data obtained from a vehicle seat;
- a generic HRTF;
- a vehicle-specific transfer function that relates to the acoustics and geometry of a specific vehicle model interior;
- a predetermined loudspeaker position; and
- a predetermined virtual source position.

Estimating Listener Head Position

Figure 2:
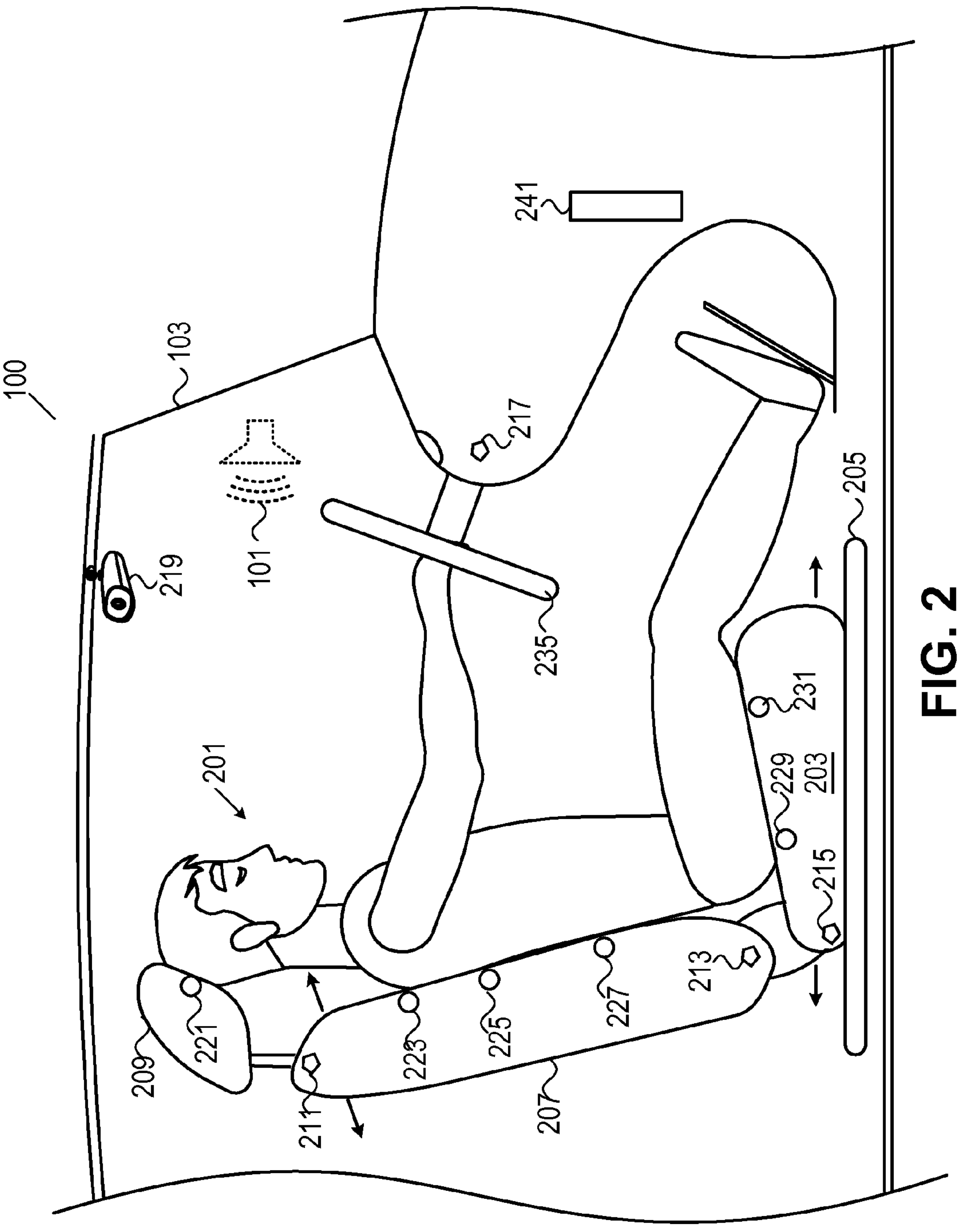
FIG. 2 conceptually illustrates a side view of a vehicle interior showing the driver sitting on an adjustable seat with position and pressure sensors.

FIG. 2 conceptually illustrates a driver 201 in vehicle interior 100. A driver 201 is seated on a seat which includes: a lower cushion 203 which attached to a vehicle floor 205; a back 207 attached to lower cushion 203, and a headrest 209 attached to back 207. Typically, all of the foregoing components may be adjusted according to the preferences of driver 201: lower cushion 203 typically can be raised, lowered, angled, and adjusted forwards or backwards; back 207 typically can be adjusted forward and backwards; and headrest 209 typically can be raised and lowered.

According to embodiments of the invention, the seat components are provided with sensors to report their respective adjustment positions: seat cushion 203 has an adjustment position sensor 215; back 207 has an adjustment position sensor 213; and headrest 209 has an adjustment position sensor 211. In addition, an adjustment position sensor 217 reports the adjustment position of a steering wheel 235.

Also, according to embodiments of the invention, the actual seating position of driver 201 is reported by contact pressure sensors in the seat components: seat cushion 203 contains pressure sensors such as contact pressure sensors 229 and 231; back 207 contains pressure sensors such as contact pressure sensors 223, 225, and 227; and headrest 209 contains a contact pressure sensor 221. These sensors detect the presence of the driver in the seat and, together with the adjustment position sensors, provide data for computing an estimated position of the driver's head.

According to embodiments of the invention, anthropometric data is used for computing the estimated position of the driver's head.

In a further embodiment of the invention, a digital camera 219 provides supplementary head position data, when lighting conditions permit. In an additional embodiment, infrared lighting is used under low-light conditions. Visual data from camera 219 may refine the estimate of the driver's head position.

Based on the estimated driver's head position, one or more transfer functions are computed, by which sounds emanating from loudspeakers 107 and 109 (FIG. 1) can be made to simulate binaural audible signals that sound to driver 201 as originating from virtual audible source 103.

As indicated previously, according to embodiments of the invention, the HRTF may be decomposed into the generic HRTF and the vehicle-specific transfer function.

In a particular embodiment, the generic HRTF provides data for a surface of a sphere centered around the mid position between the driver's ears. In a non-limiting example, the sphere has a radius of 50 cm. The vector for the loudspeaker transfer function thus involves the generic HRTF with added vehicle-related components. In this manner, HRTF tables may be acquired or measured offline, and a single generic table can be used for a large number of vehicle models.

In additional embodiments of the invention, the transfer functions may be computed once per vehicle model, for a geometrical grid covering potential driver head positions. In a non-limiting example, 500 grid points may be used. The number of grid points may vary according to the method used to estimate driver head position.

A possible location for the virtual sound source is a HUD in front of the driver projected on the windshield. The projected HUD image may be related to the audible signal; live video, static images, icons, avatars, maps, and the like may be used where applicable.

Method and Implementation

Figure 3:
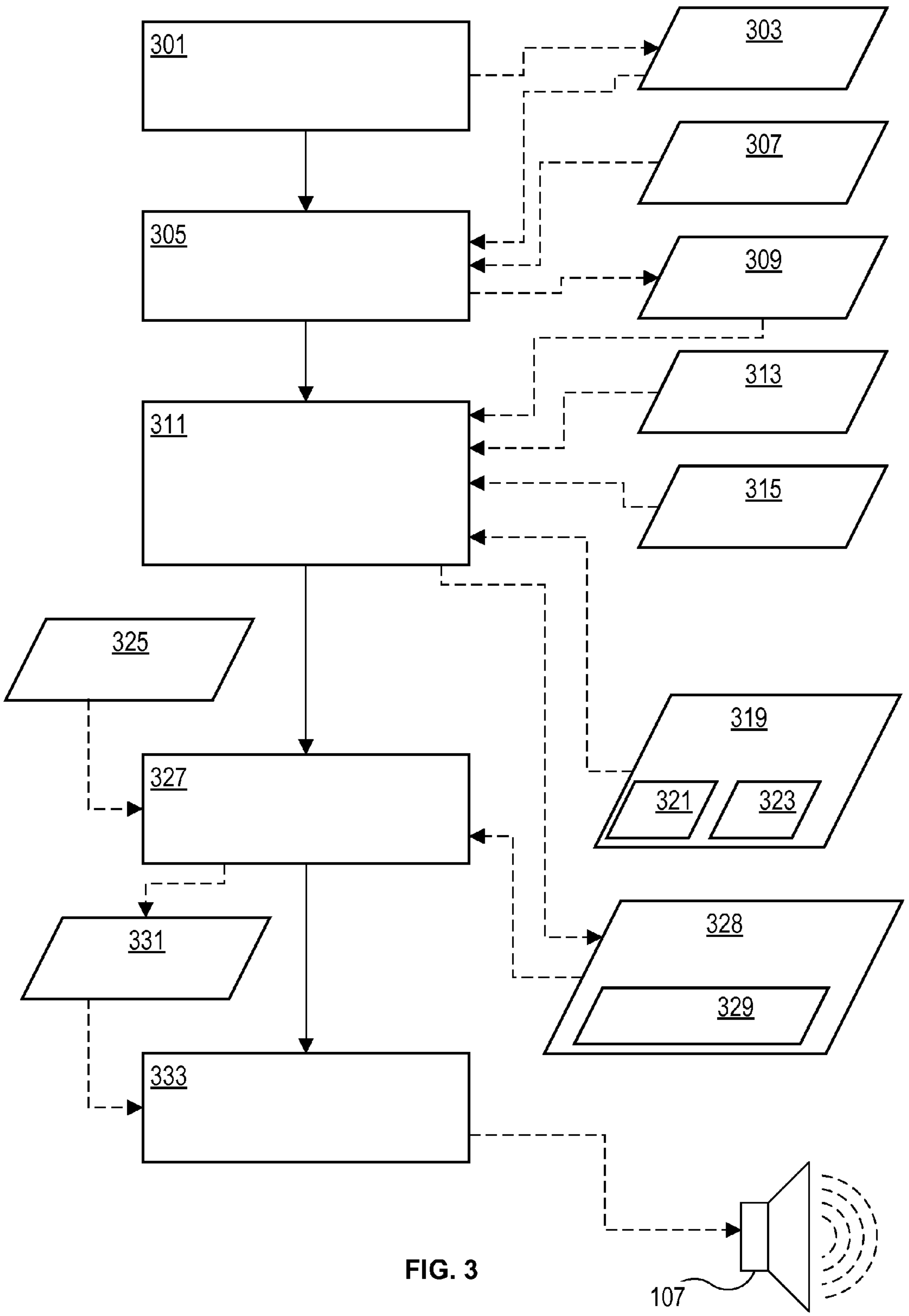
FIG. 3 illustrates a method according to an embodiment of the invention.

FIG. 3 illustrates a method according to an embodiment of the invention. In a step 301, seat data 303 related to the sitting position of driver 201 (FIG. 2) is obtained from sensors, such as sensors illustrated in FIG. 2. In a step 305, an estimated head position 309 of driver 201 is computed, based on seat data 303 and anthropometric data 307.

In a step 311, an acoustical transfer function 329 is computed, based on estimated head position 309, a virtual source location 313, a loudspeaker location 315, and a head-related transfer function (HRTF) 319. According to embodiments of the invention, HRTF 319 is composed of a generic HRTF 321 and a custom vehicle-dependent transfer function 323, which is computed specifically for the particular model of vehicle under consideration.

In an embodiment of the invention, step 311 is performed off-line once per vehicle model, for a predetermined set of grid points 328 covering a region in space where the driver's head will be.

In an embodiment of the invention, step 311 includes the use of a transfer function matrix from two loudspeakers to the ears such that a sound of one loudspeaker is perceived at one ear, cancelling the sound from the other loudspeaker at that ear, and transfer functions from the ears to a virtual source location.

In a step 327 acoustical transfer function 329 is applied to an audible signal 325 to yield a filtered audible signal 331, and in a step 333, filtered audible signal 331 is sent to loudspeaker 107 (FIG. 1). In an embodiment of the invention, steps 327 and 333 are performed repeatedly in real time. The driver's head position is estimated, as in steps 301 and 305, then the nearest grid point (of grid points 328) to the driver's head is found, and then transfer function 329 is retrieved for that grid point.

A further embodiment of the present invention provides a computer product for performing the foregoing method, or variants thereof.

A computer product according to this embodiment includes a set of executable commands for performing the method on a computer, wherein the executable commands are contained within a tangible computer-readable non-transient data storage medium including, but not limited to: computer media such as magnetic media and optical media; computer memory; semiconductor memory storage; flash memory storage; data storage devices and hardware components; such that when the executable commands of the computer product are executed, the computer product causes the computer to perform the method.

In this embodiment, a "computer" is any data processing apparatus for executing a set of executable commands to perform the method, in particular, an on-board computer in the vehicle, such as an on-board computer 241 (FIG. 2), which contains a sound-processing interface with audio amplifiers, audio filters, and appropriate software as necessary to handle all manner of audible signals, including, but not limited to: interactive dialogue, telephone conversations, navigational instructions, and so forth.

What is claimed is:

1. A method for creating a virtual audible source for an audible signal at a virtual source location relative to a driver seated in a seat of a vehicle interior, the vehicle interior having interior acoustical characteristics and at least one loudspeaker having a predetermined loudspeaker location, the method comprising:

obtaining seat data from one or more sensors located in the seat;

computing an estimated head position of the driver based on the seat data;

computing an acoustical transfer function for the at least one loudspeaker according to the estimated head position, the virtual source location, the predetermined loudspeaker location, and the interior acoustical characteristics, wherein the virtual source location is in front of the driver;

applying the acoustical transfer function to the audible signal to obtain a filtered audible signal; and sending the filtered audible signal to the at least one loudspeaker.

2. The method of claim 1, further comprising: obtaining anthropometric data related to the driver; and computing the estimated head position based on the anthropometric data.

3. The method of claim 1, wherein the sensors located in the seat include seat adjustment position sensors.

4. The method of claim 1, wherein the sensors located in the seat include driver contact pressure sensors.

5. The method of claim 1, further comprising: computing the estimated head position of the driver based on visual data obtained from at least one camera.

6. The method of claim 1, wherein computing the acoustical transfer function comprises selecting a filter from a predetermined plurality of filters associated with a geometrical grid in the vehicle interior.

7. The method of claim 1, wherein the acoustical transfer function is computed using at least a generic Head Related Transfer Function (HRTF) and a vehicle-dependent transfer function specific to the vehicle interior.

8. The method of claim 1, wherein the virtual audible source location corresponds to a head up display (HUD) image location.

9. A computer product for creating a virtual audible source for an audible signal at a virtual source location relative to a driver seated in a seat of a vehicle interior, the vehicle interior having interior acoustical characteristics and at least one loudspeaker having a predetermined loudspeaker location, the computer product comprising a set of executable commands for performing the method on an on-board computer of the vehicle, wherein the executable commands are contained within a tangible computer-readable non-transient data storage medium, such that when the executable commands of the computer product are executed, the computer product causes the on-board computer to perform: obtaining seat data from one or more sensors located in the seat; computing an estimated head position of the driver based on the seat data; computing an acoustical transfer function for the at least one loudspeaker according to the estimated head position, the virtual source location, wherein the virtual source location is in front of the driver, the predetermined loudspeaker location, and the interior acoustical characteristics; applying the acoustical transfer function to the audible signal to obtain a filtered audible signal; and sending the filtered audible signal to the at least one loudspeaker.

10. The computer product of claim 9, further comprising executable instructions, which, when executed, cause the on-board computer to perform: obtaining anthropometric data related to the driver; and computing the estimated head position based on the anthropometric data.

11. The computer product of claim 9, further comprising executable instructions, which, when executed, cause the on-board computer to perform: selecting a filter from a predetermined plurality of filters associated with a geometrical grid in the vehicle interior.

12. The computer product of claim 9, wherein the acoustical transfer function is computed using at least a generic Head Related Transfer Function (HRTF) and a vehicle-dependent transfer function specific to the vehicle interior.

13. A method for creating a virtual audible source for an audible signal at a virtual source location relative to a driver seated in a seat of a vehicle interior, the vehicle interior having interior acoustical characteristics and at least one loudspeaker having a predetermined loudspeaker location, the method comprising: computing an estimated head position of the driver based on visual data obtained from a camera; computing an acoustical transfer function for the at least one loudspeaker according to the estimated head position, the virtual source location, wherein the virtual source location is in front of the driver, the predetermined loudspeaker location, and the interior acoustical characteristics, wherein the computing the acoustical transfer function uses at least: a Head Related Transfer Function (HRTF) decomposed into a generic HRTF and a vehicle dependent transfer function specific to the vehicle interior; applying the acoustical transfer function to the audible signal to obtain a filtered audible signal; and sending the filtered audible signal to the at least one loudspeaker.

* * * * *